Jan. 27, 1925.
C. W. LARNER
1,524,400
VALVE STRUCTURE
Filed Nov. 25, 1919
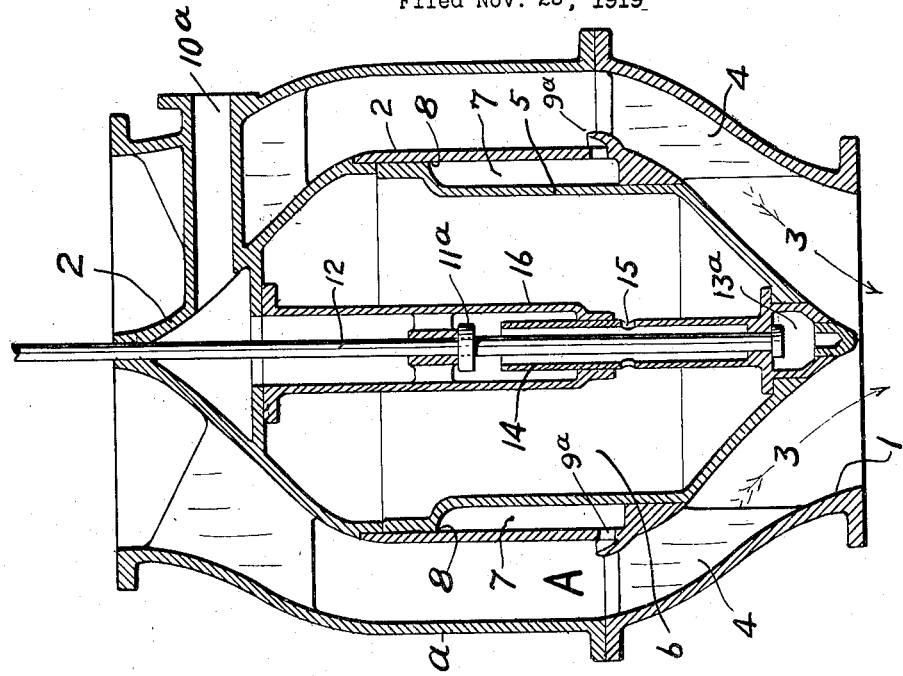
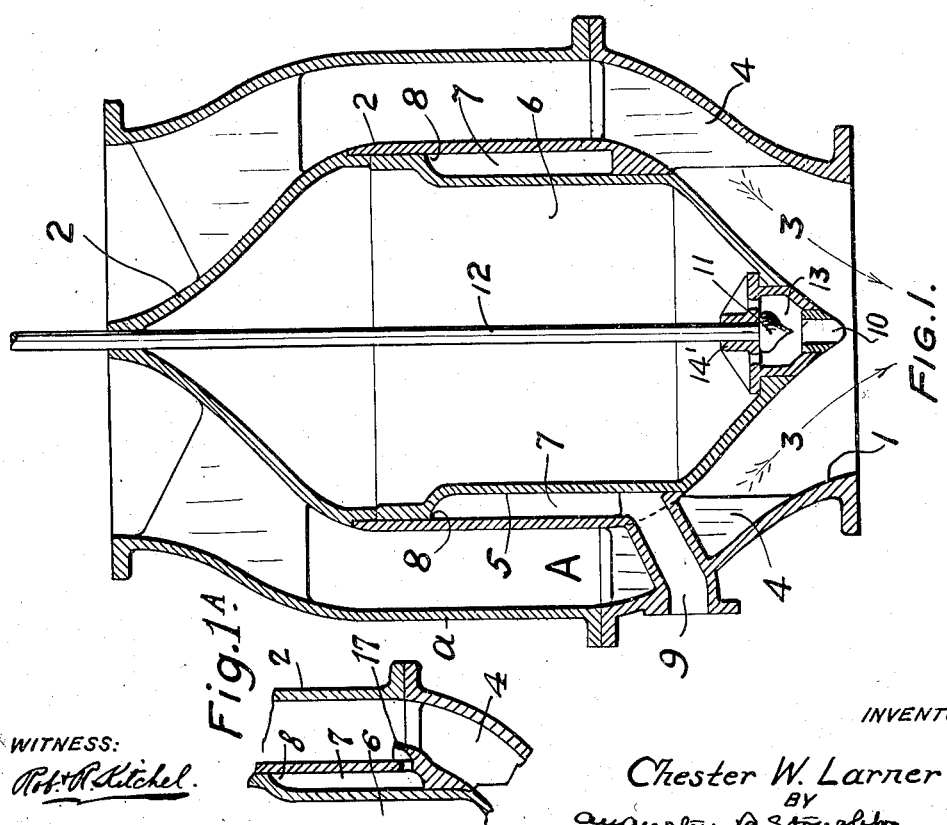
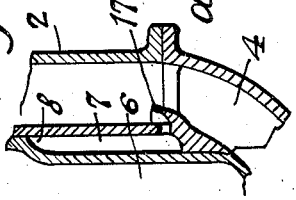
INVENTOR
Chester W. Larner
BY
Augustus B. Stoughton
ATTORNEY.
WITNESS:
Rob. R. Kitchel.

Patented Jan. 27, 1925.

1,524,400

UNITED STATES PATENT OFFICE.

CHESTER W. LARNER, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

VALVE STRUCTURE.

Application filed November 25, 1919. Serial No. 340,632.

*To all whom it may concern:*

Be it known that I, CHESTER W. LARNER, a citizen of the United States, residing at Philadelphia, in the county of Philadelphia and State of Pennsylvania, have invented certain new and useful Improvements in Valve Structures, of which the following is a specification.

In certain installations of hydraulically operated plunger valves it is desirable to operate the valves hydraulically even in the absence of flow through their water ways. For example, in the case of canal locks when the level in the reach and in the lock basin is the same there is no flow through the connecting conduit, and any hydraulically operated valve interposed in the conduit and dependent for operation upon flow through its water way or upon difference in pressure at different points in the conduit could not be hydraulically operated or controlled under those circumstances.

One object of the present invention is to provide an hydraulically operated plunger valve capable of operation hydraulically even when there is no flow through its water way and no difference in pressure at the inlet and outlet sides of its water way. Another object of the invention is to provide an hydraulically operated plunger valve especially adapted to fulfill the requirements of use in the control of canal locks. Another object of the invention is to provide means of augmenting the opening force applied to the plunger as compared with valves of the type described in applicant's co-pending application, Serial No. 294,155. Other objects of the invention will appear from the following description which will be made in connection with the accompanying drawings forming part hereof and in which Figure 1, is a view, principally in central section, illustrating a valve structure embodying features of the invention, and applicable under the conditions presented for example, in canal installations for the purpose of emptying or filling the locks when pressure for operating the valve is available from a region of pressure higher than the pressure on the valve when the levels on both sides of the valve are equalized and flow through the valve has therefore ceased.

Fig. 1ª is a view of a portion of Fig. 1 showing a modified detail, and

Fig. 2, is a similar view of a valve structure embodying a modification of the invention and applicable under the conditions presented, for example, in canal installations for the purpose of emptying or filling the locks when pressure for operating the valve may be discharged to a region of lower pressure or level than the pressure on the valve when the levels in the locks have equalized and flow through the valve has therefore ceased.

In the drawings 1, is a valve seat and 2, is a cylinder spaced from the seat with a water way or passage 3, between the two. In the structure shown in the drawings the seat 1, is prolonged to provide a housing $a$, which can be replaced by a concrete or other suitable structure. As illustrated in the drawings, ribs or columns 4, are provided in order to hold the cylinder and seat in spaced relation and when this is done a unitary structure is provided. 5, is a valve plunger slidable in the cylinder and co-operating with the seat 1. The cylinder and plunger are shaped to form a central chamber 6, in the plunger 5, and these chambers 6 and 7, are in limited or restricted communication, as shown, by the leakage space 8, which is one way of providing such limited or restricted communication; other ways are of course within the invention. There is a constant or continuing connection of relatively high pressure to the annular chamber 7. In Fig. 1, this connection is indicated at 9, and in Fig. 2, at 9ª. There is a connection of relatively low pressure to the central chamber, which is indicated in Fig. 1, at 10, and in Fig. 2, at 10ª. A valve arranged in the central chamber 6, is provided for controlling the connection last referred to (10 and 10ª) to build up and relieve pressure in the central chamber 6, in opposition to, or in differentiation with, the pressure available in the annular chamber 7, to hydraulically operate the plunger. In Fig. 1, this valve is marked 11, and in Fig. 2, it is marked 11ª. The valve spindle 12, enters the central chamber 6, and is shown as having lost-motion mechanical connection with the plunger 5. In Fig. 1, this lost-motion connection is indicated at 13, and in Fig. 2, it is indicated at 13ª. In Fig. 1, the valve 11, is arranged in a spider-housing or guide 14', whereas in Fig. 2, the valve 11ª, co-operates with the end of a tube 14, carried by the plunger 5, and provided with ports 15, which tube 14, telescopically works in a sleeve 16, carried by the cylinder 2, and communicating with the connection 10ª.

Without intending to limit the invention to any use to which it is applicable, its mode of operation will be described with some reference to canal installations, because it is believed that such course will facilitate the explanation.

Referring to Fig. 1, A, indicates the conduit between two lock basins and in that case the connection 9, is in communication by suitable means not shown, for example, with the high level reach, therefore the available pressure supplied by it to the annular chamber 7, exceeds the pressure in the conduit A, and at the connection 10, even when there is no flow through it on account of the level in the two lock basins which it connects being equalized, for the equalized level in the two lock basins is always below the level of the upper reach. To operate the plunger 5, hydraulically, for example to open it and hold it open, the valve 11, is opened and this allows pressure to escape from the central chamber 6, but not from the annular chamber 7, it being remarked that the capacity at the valve 11, considerably exceeds the capacity at the communication 8. Pressure in the chamber 7, will exceed pressure in chamber 6, because the connection 9, is subjected to greater pressure than can exist at the connection 10, or in the conduit whether there be flow therein or not as has been explained. To close the plunger 5, in respect to its seat 1, the valve 11, is closed thus letting pressure build up in the central chamber 6, from the annular chamber 7, so closing the valve, it being remarked that the effective piston acting area of the chamber 6, exceeds that of the chamber 7. In the arrangement shown gravity favors the descent of the plunger.

In Fig. 2, the connection 9ª, is to normal pressure, for example, to the pressure in the conduit A, which is the pressure due to the level in the lock basin, and at the connection 10ª, the pressure is due to the lower reach which is always lower. The operation, however, is substantially the same as has been described in connection with Fig. 1. Connections 9ª, may be provided with lips or scoops to increase the pressure in chamber 7, by the addition of the velocity head of the water flowing through the conduit A.

In each case the pressure at the connection 9 or 9ª, is greater than the pressure at the connection 10 or 10ª, and the operation of the plunger is not dependent upon flow through the water way 3, or to difference in pressure in the conduit A. The valves 11 and 11ª, may not in all cases be ever completely closed for their partial closing may be sufficient to build up the necessary pressure in the central chamber 6, for controlling the plunger movements. The mechanical connection at 13 and 13ª, is available for the movement of the plunger by mechanical means in cases where such an expedient is desired.

It should be noted that plunger 5, may be held stationary at any position intermediate between closed and open, since the plunger will automatically adjust itself in relation to control valves 11 and 11ª, so as to produce a pressure inside the plunger equal in effect to the pressure outside, thus holding the plunger in a stationary position. As a result of this automatic action the position of the plunger is dependent upon the position of the control valve.

The invention is not limited to valves having the axis vertical, but is operative in any position.

If the valve is used under conditions where there is always flow when the valve is open, or where it is not objectionable to hold the plunger open mechanically when flow ceases, the high pressure connection 9, Figure 1, may be replaced by ports connecting the annular chamber 7, with the water way. A more effective arrangement may be secured by providing the ports with lips or scoops pointing up stream, as shown at 17 in Fig. 1ª, to catch the flow in the water way and thus add the velocity head of the flowing water to the pressure in the annular chamber 7.

Reference to co-pending application, Serial No. 294,155, will show that the pressure of the water way exerted on the annular area of the plunger outside the plunger seat which tends to open the plunger is less than the static pressure on the valve whenever there is flow through the valve. It is therefore clear that if the shape of the plunger is modified as shown in the present invention the annular area referred to is transferred inside the annular chamber 7, formed around the plunger, and may thus be exposed to the static pressure of the system or to a higher pressure, if such is available. This feature is of value in the case of vertical valves operating under low heads where the opening force is small as compared with the weight of the plunger and also in other cases where the valves may stand in the closed position for long periods and are liable to stick from dirt or corrosion. The static pressure may be piped into the annular chamber 7, from any part of the system where it is obtainable, or may be taken directly from the water way of the valve through openings in cylinder 2, provided with lips or scoops as shown at 17, Figure 1ª.

Other modifications may be made in the form and arrangement of the instrumentalities used to embody the invention, hence the same is not limited as to such matters.

I claim:

1. A valve structure comprising the combination of a valve seat and cylinder with a water way between the two, a unitary plunger valve slidable in the cylinder and co-operating with the seat, said cylinder and plunger being shaped to form a central chamber and an annular chamber between which there is limited communication, a connection from one of said chambers to the water way, a connection of different pressure than the water way to the other of said chambers, a valve and valve seat carried by the plunger for discharging pressure from the central chamber to open the plunger, and means for operating the last named valve.

2. A valve structure comprising the combination of a valve seat and cylinder with a water way between the two, a plunger valve slidable in the cylinder and co-operating with the seat, said cylinder and plunger being shaped to form a central chamber and an annular chamber between which there is limited communication, connections from one of said chambers to the water way and from the other of said chambers to a source of pressure higher than the pressure in the water way, and a valve for controlling the connection to the water way.

3. The combination of a canal lock system including a conduit and an element of higher pressure than the conduit even at slack water therein, a valve structure arranged in the conduit and comprising a spaced valve seat and a cylinder around which water may be slack, said cylinder and plunger being shaped to form a central chamber and an annular chamber between which there is limited communication, a connection from said central chamber to the conduit, a connection from said annular chamber to said element of higher pressure, a valve for discharging pressure from said central chamber to open said plunger, and means for operating the last mentioned valve so that the plunger may be moved at slack water in said system.

4. A valve structure comprising the combination of a casing having a valve seat and a cylinder with a water way between the two, a plunger valve slidable in the cylinder and cooperating with the seat, said cylinder and plunger being shaped to form a central chamber and an annular chamber having not more than a limited leakage connection between them and the end of said plunger forming with said valve casing part of a fluid way, a connection from one of said chambers to a region of low pressure in said fluid way, a connection from the other of said chambers to the fluid way, and valve means controlling the connection to the region of low pressure and adapted to control the internal pressure in said central chamber so as to move said plunger and hold it hydraulically balanced and stationary in any desired position without the exertion of mechanical force on the plunger.

5. A valve structure comprising the combination of a casing having a valve seat and a cylinder with a water way between the two, a unitary plunger valve slidable in the cylinder and cooperating with the seat, said cylinder and plunger being shaped to form a central chamber and an annular chamber between which there is limited leakage communication and said plunger forming with said valve casing a fluid way having a region of low pressure, a connection from one of said chambers to said region, a connection from the other of said chambers to another conduit connected to said fluid way, and valve means controlling the connection to the region of low pressure and adapted to control the internal pressure in said central chamber so as to move said plunger and hold it hydraulically balanced and stationary in any desired position without the exertion of mechanical force on the plunger.

6. A valve structure comprising the combination of a casing having a valve seat and a cylinder with a water way between the two, a unitary plunger valve slidable in the cylinder and cooperating with the seat, said cylinder and plunger being shaped to form a central chamber and an annular chamber having not more than a limited leakage connection between them and said plunger forming with said valve casing a fluid way having a region of low pressure, a connection from one of said chambers to said region, a connection from the other of said chambers to another conduit connected to said fluid way having higher pressure, and valve means in said central chamber controlling the flow therethrough from the region of higher pressure to the region of lower pressure so as to move said plunger and hold it hydraulically balanced and stationary in any desired position without the exertion of mechanical force on the plunger.

7. A valve structure comprising the combination of a casing having a valve seat and a cylinder with a water way between the two, a plunger valve slidable in the cylinder and cooperating with the seat, said cylinder and plunger being shaped to form a central chamber and an annular chamber between which there is limited leakage communication said plunger forming with said valve casing a fluid way having a region of relatively low pressure, a connection from said central chamber to said region of low pressure, a connection between said annular chamber and another conduit connected to said fluid way, and a valve means controlling the flow from said central chamber to said region of low pressure so as to control the pressure in said chamber to move said plunger and hold it stationary and hydraulically balanced in any desired intermediate position without the exertion of mechanical force on the plunger.

CHESTER W. LARNER.